(12) United States Patent
Brancuzsky et al.

(10) Patent No.: US 10,690,409 B2
(45) Date of Patent: *Jun. 23, 2020

(54) METHOD FOR CONTINUOUSLY DRYING BULK GOODS, IN PARTICULAR WOOD FIBERS AND/OR WOOD CHIPS

(71) Applicant: Douglas Technical Limited, Douglas (IM)

(72) Inventors: Zdenek Brancuzsky, Jihlava (CZ); Gunter Hensel, Venlo (NL); Karel Napravnik, Jihlava (CZ); Wolfgang Seifert, Lampertswalde (DE)

(73) Assignee: Douglas Technical Limited, Douglas (IM)

( * ) Notice: Subject to any disclaimer, the term of this patent is extended or adjusted under 35 U.S.C. 154(b) by 210 days.

This patent is subject to a terminal disclaimer.

(21) Appl. No.: 15/332,028

(22) Filed: Oct. 24, 2016

(65) Prior Publication Data

US 2017/0051972 A1    Feb. 23, 2017

Related U.S. Application Data

(63) Continuation of application No. 12/812,467, filed as application No. PCT/EP2009/000087 on Jan. 9, 2009, now Pat. No. 10,551,121.

(30) Foreign Application Priority Data

Jan. 10, 2008    (EP) .................................... 08000348

(51) Int. Cl.
*F26B 1/00*    (2006.01)
*F26B 11/02*    (2006.01)
(Continued)

(52) U.S. Cl.
CPC ................ *F26B 1/005* (2013.01); *F23G 5/46* (2013.01); *F23L 15/04* (2013.01); *F26B 11/02* (2013.01);
(Continued)

(58) Field of Classification Search
CPC ........ F23L 15/04; F23G 5/46; F23G 2206/10; Y02E 20/348; F26B 1/005; F26B 25/22;
(Continued)

(56) References Cited

U.S. PATENT DOCUMENTS 1,795,418 A    3/1931    Bailey
2,421,902 A *  6/1947    Neuschotz .......... C03B 19/1085
                                                              252/378 P
(Continued)

FOREIGN PATENT DOCUMENTS

CA    1074105 A1    3/1980
CA    1200523 A1    2/1986
(Continued)

OTHER PUBLICATIONS

International Search Report for corresponding application No. PCT/EP2009/000087 dated Mar. 12, 2009.
(Continued)

*Primary Examiner* — Jessica Yuen
(74) *Attorney, Agent, or Firm* — Renner, Otto, Boisselle & Sklar, LLP (57) ABSTRACT

A method for drying bulk goods, in particular wood fibers and/or wood chips, wherein the bulk goods is continuously dried in a dryer (1), in particular a drum dryer. The vapor-gas mixture flows through the drum dryer (1) in a dryer circuit and is indirectly heated via at least one heat exchanger (4) by a burner waste gas that is heated in at least one burner (5). The drying vapors are supplied to the at least one heat exchanger (4). Upstream, downstream and/or within the at
(Continued)

least one heat exchanger (4), at least a partial flow of the drying vapors are branched off to be conducted into the burner (5). The remaining partial flow is conducted to the dryer (1) again. The partial flow of drying vapors to the burner (5) is driven by at least one regulable partial vapor fan (10).

30 Claims, 3 Drawing Sheets

(51) Int. Cl.
| | |
|---|---|
| *F26B 21/04* | (2006.01) |
| *F23L 15/04* | (2006.01) |
| *F26B 23/02* | (2006.01) |
| *F23G 5/46* | (2006.01) |
| *F26B 21/08* | (2006.01) |
| *F26B 25/22* | (2006.01) |

(52) U.S. Cl.
CPC ............ *F26B 11/028* (2013.01); *F26B 21/04* (2013.01); *F26B 21/08* (2013.01); *F26B 23/022* (2013.01); *F26B 23/028* (2013.01); *F26B 25/22* (2013.01); *F23G 2206/10* (2013.01); *F26B 2200/24* (2013.01); *Y02E 20/348* (2013.01)

(58) Field of Classification Search
CPC ...... F26B 11/02; F26B 23/028; F26B 11/028; F26B 23/02; F26B 23/002; F26B 23/007; F26B 23/022; F26B 21/02; F26B 21/04; F26B 21/06; F26B 21/08; F26B 21/14; F26B 2200/24; F26B 2210/16; F26B 3/18
See application file for complete search history.

(56) References Cited

U.S. PATENT DOCUMENTS

| | | | |
|---|---|---|---|
| 2,948,966 A | | 8/1960 | Hanson |
| 2,998,200 A | * | 8/1961 | Litwinoff ................ F23K 1/00 241/33 |
| 3,576,384 A | | 4/1971 | Peczeli et al. |
| 4,979,447 A | | 12/1990 | Farrar |
| 5,161,488 A | | 11/1992 | Natter |
| 5,271,162 A | | 12/1993 | Kunz et al. |
| 5,749,160 A | | 5/1998 | Dexter et al. |
| 5,797,332 A | | 8/1998 | Keller et al. |
| 6,238,207 B1 | | 5/2001 | Sarkinen |
| 2002/0064085 A1 | | 5/2002 | Takahashi et al. |

FOREIGN PATENT DOCUMENTS

| | | |
|---|---|---|
| CA | 2257209 C | 12/1997 |
| DE | 19654043 | 7/1997 |
| DE | 10157596 | 3/2003 |
| EP | 0346042 | 12/1989 |
| EP | 0385372 | 9/1990 |
| EP | 0385411 | 9/1990 |
| EP | 0457203 | 11/1991 |
| EP | 0459603 | 12/1991 |
| EP | 0484280 | 5/1992 |
| EP | 0508546 | 10/1992 |
| EP | 0714006 | 5/1996 |
| GB | 1173036 | 12/1969 |
| GB | 1564743 | 4/1980 |
| JP | 3883885 B2 * | 2/2007 |
| KR | 2001073869 A | 8/2001 |
| SU | 1430703 A1 | 10/1988 |
| WO | 92/01897 | 2/1992 |
| WO | 92/11983 | 7/1992 |
| WO | 2004/079282 | 9/2004 |

OTHER PUBLICATIONS

European Search Report for divisional patent application No. EP 11174167.4 dated Nov. 16, 2011.

Canadian Office Action for corresponding Canadian Patent Application No. 2,712,007 dated Sep. 19, 2013.

* cited by examiner

METHOD FOR CONTINUOUSLY DRYING BULK GOODS, IN PARTICULAR WOOD FIBERS AND/OR WOOD CHIPS

CROSS REFERENCE TO RELATED APPLICATION

This is a continuation of U.S. patent application Ser. No. 12/812,467, filed Oct. 18, 2010, which is a national phase of International Application No. PCT/EP2009/000087 filed Jan. 9, 2009, which claims priority to EP 08000348.6 filed Jan. 10, 2008, all of which are hereby incorporated by reference.

FIELD OF INVENTION

The present invention relates to a method for continuously drying of bulk goods, in particular wood fibers and/or wood chips, in a dryer, wherein the drying vapors are led to a dryer circuit, in which the drying vapors are indirectly heated via a heat-exchanger and are conducted to the dryer again.

BACKGROUND

The manufacturing of boards made from wood materials is based essentially on the pressing of hackled wood pieces, in particular of wood fibers and/or wood chips. For example, a chip board consists of small wood chips with different thickness, which are pressed together with a binder and under application of high pressure to form boards. Wood fiber boards are produced from wooden fiber with or without an additional bonding agent.

Before being pressed to boards, the hackled wood pieces have to be dried. This is usually done in so called drum dryers, wherein the goods to be dried respectively the bulk goods are moved in a heated, rotating tube. During the drying also gaseous wood contents are freed in addition to water vapor, which must not be released to the environment since they are considered as pollutants. The drying vapors are further contaminated with fine particulate matter. For this reasons, the drying vapors have to be cleaned before they can be released to the environment. This is achieved usually by dust removal, filtering and/or a burn-out in the burner of the dryer. To reduce the costs for this treatment of the drying gases and in particular to reduce the additionally necessary energy consumption, different methods and apparatuses are suggested, which enable a more economic process by guiding the drying gases in a circuit and subjecting the same to an indirect heating via a burner.

The European patent application EP 0 459 603 A1 describes for example a drying of wood fibers in a drum dryer, wherein the drying vapors exciting the dryer are led back in a circuit to the dryer and are heated indirectly through the heating gas produced by the burner until they reach the temperatures necessary for drying the wood chips. A part of the drying vapor is removed from this circuit and guided to the combustion chamber. The exhaust gases from the combustion chamber, which are used to heat-up the drying gases via a heat-exchanger, are cleaned with a filter, before they are released to the environment.

The European patent application EP 0 457 203 A1 describes also a drying method among others for wood chips, wherein the drying gases are indirectly heated by a heat-exchanger and wherein the heat-exchanger is energized with the exhaust gases of a combustion chamber. A part of the drying vapors is continuously removed from the dryer and fed to a condenser wherein the water contend is condensed and wherein the non-condensable gases are led as combustion air into the combustion chamber.

With these methods the temperatures in the combustion chamber have to be kept sufficiently high, to assure the burning off of any pollutants. These high temperatures put a strain to the elements of the heat-exchanger so that the lifetime thereof is reduced. For this reason, the European patent application EP 0 714 006 suggests a drying method, wherein a second heat-exchanger is arranged before the first heat-exchanger in order to reduce the thermal strain of the material.

During the drying process in the circuit constantly new vapors are produced which are contaminated with pollutants. The circulating drying vapors therefore have to be continuously removed, to achieve a mass balance. This is done for example by removing a part of the drying vapors downstream or upstream of the heat-exchanger and to guide this part as combustion air to the burning chamber. For the control of the flow rate the European patent application EP 0 714 006 A1 suggests for example a valve.

SUMMARY OF THE INVENTION

A problem of the known methods is, that the system may not react sufficiently to changing conditions as for example to changing moisture content, changing grain size, changes in the wood mixture or changes in the load. The present invention provides an improved method for the continuous drying of bulk goods.

With the inventive method for continuously drying of bulk goods, in particular wood fibers and/or wood chips in a dryer in particular a drum dryer, the dryer is fed with the bulk goods, and a vapor gas mixture is guided there through in a drying circuit. Hereby the vapor gas mixture is indirectly heated via at least one heat-exchanger with burner exhaust gases from a burner. After passing through the dryer, the drying vapors are guided to the at least one heat-exchanger and are heated-up again. Upstream, downstream and/or within the at least one heat-exchanger, at least a partial flow of the drying vapors is branched off to be guided as cooling air and/or as combustion air to the burner. The remaining partial flow is again guided to the dryer, after it was heated-up in the at least one heat exchanger. Preferably, two parallel arranged heat-exchangers are used, which are operated in cross counter flow. Particularly advantageously, a part of the drying vapors is branched off within the heat-exchanger since a branching off within the heat exchanger provides energetic and emission advantages.

In view of the actual drying method the vapor circuit drying achieves a gentle drying and a oxygen reduced atmosphere with a reduced amount of removed polluting compounds and thus a quality improvement of the drying goods compared to other drying methods. It allows to increase the flexibility and the softness of the wood chips, which is in particular advantageous in view of the later processing of the wood chips and the quality of the end product. By means of the vapor circuit for the drying, which is achieved by the indirect, essentially oxygen free heating of the drying gases via a heat-exchanger, an inert gas content is achieved, which effects as a further advantage a reduced wear of the apparatus and an increased security due to a reduced risk of fire and explosions.

The partial flow of the drying vapors which is removed upstream, downstream and/or within the heat exchanger to the burner is driven by a regulable partial vapor fan.

A regulable partial vapor fan allows a controlled burning off of pollutants in the burner of the drying arrangement.

Due to the regulable partial vapor fan, the flow rate and flow speed of the partial flow of the drying vapors to the burner can be adjusted to the respective conditions of the drying process. It is for example possible to react to certain properties of the drying goods, as for example moisture content or mass flow, by removing for example a larger partial flow of the drying vapors to the burner if an increased moisture content is recognized. This secures an optimal process control and an effective removal of pollutants by a burn-out in the burner. The regulable partial vapor fan allows that the mass respectively volume flows can be increased and that thereby the output of the drying process can significantly be increased. The oxygen content in the dryer can be controlled to a minimum to minimize the production of organic compounds and to reduce thereby the emissions. Additionally, due to the regulable partial vapor fan the burn-out performance as well as the distribution of the vapors in the burning chamber can be influenced whereby the emissions can be further reduced.

Advantageously, upon regulating the partial vapor fan, the mass balance in the system is considered, so that for example the introduction of leak air into the system can be reduced. The uncontrolled intrusion of leak air into the system leads to energetic disadvantages, since the leak air has to be heated-up in the system before it can be used in the process. The control therefore keeps the amount of leak air in a certain corridor.

In a particularly preferred embodiment of the inventive method, the control of the partial vapor fan is carried out taking into account the level of pollutants in the exhaust gases of the burner. The level of pollution may for example be directly measured before the exhaust gases of the burner are released to the environment, wherein the exhaust gases of the burner are preferably cleaned beforehand. As levels of pollutants preferably the concentration of nitrogen oxide and/or the concentration of carbon monoxide of the exhaust gases of the burner can be considered. According to the invention it can be provided, that certain thresholds of these concentrations are determined and that the regulable partial vapor fan is effected if these pollution thresholds are not met. Further, according to the invention it may be provided that a control of the regulable partial vapor fan is carried out considering the oxygen content in the exhaust gas of the burner. Depending on the fuel used for example the control may be carried out according to an oxygen content of approximately 3 Vol % up to approximately 11 Vol % in the exhaust gas.

In a further preferred embodiment of the inventive method, the control of the regulable partial vapor fan is carried out taking into account the maximum inert gas content in the drying circuit, preferably by measuring the oxygen content and/or the water content in the drying vapors. Thereby an increased output of the drying method as well as an increased quality of the drying goods, for example an improved quality of the wood chips, can be achieved. By maximizing the inert gas content in the drying circuit the deposition, pollution and thus the wear of different parts of the apparatus are kept to a minimum. Additionally, the security of the apparatus is increased due to the minimization of the risk of fire and explosion.

In a further embodiment of the inventive method, the control of the regulable partial vapor fan is carried out taking into account the level of pollutants in the exhaust gases of the burner and the oxygen content in the exhaust gas of the burner and the maximum inert gas content in the drying circuit.

In a preferred embodiment of the inventive method the exhaust gases of the burner, which are removed from the system, are passed to a filter, in particular an electrostatic precipitator preferably a dry type electrostatic precipitator for cleaning therefore. A filtering of the exhaust gases of the burner is in particular advantageous in the case of wood dust being burned in the burning chamber to reduce the emissions. An electrostatic precipitator has the advantage that compared to ordinary bag filters the risk of fire is reduced. A dry type electrostatic precipitator has shown to be particularly effective in cleaning the exhaust gases of the burner. It is particularly preferred to operate the filter, in particular the electrostatic precipitator, in a suction operation, wherein preferably downstream of the filter a burner exhaust gas fan is arranged. The suction operation is advantageous, since the under pressure deriving there from offers advantages with regard to the construction of the filter and since the fan is protected from wear. As fuel for the burner ordinary fossil fuels may be used as for example natural gas or oil. In a particularly preferred embodiment additionally or alternatively solids are used in particular biomass. For example, waist from the production of the wooden boards, as for example wood dust or similar, may be burned. The advantage of this process is, that waste, which is produced anyway, can be used as fuel in the combustion chamber.

In a preferred embodiment of the inventive method a cleaning device is provided for the drying vapors, which vapors contain in particular fine dusts and different organic parts deriving from the drying of the bulk goods. As cleaning device, one can for example use a cyclone separator, in particular one or more cyclone batteries. Inside of the cyclone the solid or liquid particles, as for example fine dusts, contained in the drying gases are separated, by transferring the drying gases into a rotary motion, whereby the centrifugal force acting on the particles will accelerate the particles and move them radically outwardly. Thereby, the particles can be separated from the gas and may preferably be removed downwards. Between the dryer and the cleaning device, as for example the cyclone batteries, and/or between the cleaning device and the heat-exchanger the drying vapors are preferably driven by means of a drying vapor fan. Due to the flow circuit of the drying gases the drying vapor fan is protected from dirt and thus wear.

In a particularly preferred embodiment of the inventive method the water content in the dryer is controlled. The bulk goods, as for example the wood fibers or wood chips, are advantageously separated to different fractions depending on the moisture content and the bulk goods are metered from the different fractions via a metering device, such that a desired moisture content can be maintained in the bulk goods introduced to the dryer. For example, three silos each containing a certain fiber type may be provided, wherein each fiber type has a particular moisture content. The moisture of the bulk goods to be dried, and which are moved to the dryer, can for example be continuously measured. For example by means of a detected program the composition of the drying goods can be controlled, such that a continuous water flow in the dryer can be secured. The control can be achieved in a particular advantageous manner such that the water flow in the dryer remains constant. This control of the water content in the dryer has the advantage that differing moister contents in the drying goods, as for example the wood fibers, can be balanced out. Further, due to the control of the water content in the dryer, the inert gas content in the drying circuit can be optimized which is for example advantageous in view of the quality of the drying goods and increases in addition the output of the drying process.

In a particularly preferred embodiment of the inventive method further exhaust gases are fed to the burner as combustion air, as cooling air and/or for muffle cooling. Preferably these further exhaust gases are taken from the production process of the wood material boards, as for example exhaust air from the pressing devices, exhaust gases from the sawing devices etc. This integration of different emission sources into the inventive method has the advantage, that the different exhaust gases can be post-treated in the combustion chamber, to achieve thereby a burn-out of the pollutants in the exhaust gases. Due to economic reasons it is preferred to post treat all the different exhaust gases, in particular all the exhaust gases deriving from the manufacturing of the wood material boards in this way. Preferably, the additional exhaust gases are pre heated before they are supplied as combustion air. To this aim different heat-exchangers may be provided, as for example thermal oil heat exchanges. By pre heating the exhaust gases before the same are guided to the combustion chamber the necessary temperature in the combustion chamber can be achieved in a particular economic manner.

In a particularly preferred embodiment of the inventive method the cooling air supply to the burner is achieved via an interior and an exterior nozzle ring in the ceiling of the combustion chamber. It is particularly preferred, that these nozzle rings can be controlled separately from each other. Preferably, the inner nozzle ring and/or the outer nozzle ring are provided with a pre-adjusted entering angle for the respective fuel which is in the range between approximately 0 and approximately 60 degrees. Due to this construction of the cooling air supply respectively of the ceiling of the combustion chamber and the particular air supply in the combustion chamber as well as the guiding of the secondary air and the condensation deriving there from, combustion in the combustion chamber is achieved in a particular advantageous manner.

The cooling air supply into the burner can for example be taken from the partial vapor flow, which is for example branched off from the heat-exchanger. The control of the different rings is preferably achieved with suitable valves.

In a further preferred embodiment of the inventive method, the muffle of the burner is cooled. For example, the muffle may be cooled with fresh air. In another preferred embodiment the cooling of the muffle is done with process air. For example, one can use as cooling air for the muffle which is branched off from the partial flow of the drying vapors, or from partial flows branched off the drying vapors upstream, downstream and/or from within the heat exchanger(s). In alternative embodiments exhaust gases of the burner are used as cooling air, after the same are passed though the heat-exchanger and/or exhaust gases, which are branched off before releasing via the chimney and in particular exhaust gases which have been passed through the filter. The control of the muffle cooling is preferably dependent on the temperature of the muffle, to protect the muffle. The control can further be done dependent on the carbon monoxide content of the exhaust gases, wherein additionally the temperature control of the muffle can be used.

The invention further provides a method for the manufacturing of wooden material boards, wherein wood logs are stripped of bark and are processed in a crushing device to fibers and/or wood chips, in particular in a milling machine. The chips and/or fibers are dried in a drying apparatus and—if necessary by adding binders and/or further additives—processed to boards in a pressing device and if necessary cut to size. This method is characterized in that for the drying of the chips and/or fibers a method is used as it was described above. With regard to further features of the method for the manufacturing of wooden material boards it is referred to the above description.

The invention further provides an apparatus for the drying of bulk goods, in particular of wood fibers and/or wood chips, with a dryer, in particular a drum dryer, through which a vapor gas mixture is passed in a drying circuit. The apparatus further comprises at least one heat-exchanger for the indirect heating-up of the vapor gas mixture and it comprises a burner. The burner creates exhaust gases, which can be used for the indirect heating of the vapor gas mixture. Further, at least one branch line to the burner is provided upstream, downstream and/or within the at least one heat-exchanger for a partial flow of the drying vapors and at least one line is provided for the remaining part of the drying vapors to the dryer.

At least one regulable partial vapor fan is provided to move the partial flow of the drying vapors to the burner. Concerning further features of the inventive apparatus it is referred to the above descriptions.

Finally the invention provides an apparatus for the manufacturing of wooden material boards comprising at least one crushing device, in particular a milling machine, at least one pressing device and at least one drying device for bulk goods, as it was described above. With regard to further features of this apparatus for the manufacturing of wooden material boards respectively with regard to the drying device of this apparatus it is referred to the above description.

The inventive method for drying of bulk goods is in particular suited for the drying of wood chips. The inventive vapor atmosphere in the drying circuit has positive effects to the quality of the wood chips. The gentle drying of the wood chips realized thereby achieves flexible and soft wood chips, which do not show any thermal discoloration. Due to the inert gas atmosphere during the drying the ignition potential of the drying goods and thus the fire hazard in the dryer respectively in the whole apparatus can be reduced. The same is true, if the inventive method is used for the drying of wood fibers. When drying wood fibers it is in particular the inventive controlled and adjusted moister contend in the drying goods which is advantageous, since the moisture of wood fibers is usually very problematic in the subsequently following processing of the fibers, in particular in the press section. Different from the processing of wood chips no intermediate storage of the dried wood fibers takes place. Rather, the pressing of the wood fibers follows directly after the drying, so that the moisture content of the drying goods corresponds directly to the moisture in the press section. The inventive method has the advantage that a controlled and continuous quality of the dried bulk goods can be provided for the further processing.

Further advantages and features of the invention derive from the following description of the drawings in connection with the preferred embodiments and the sub-claims. Hereby, the different features may be realized alone or in combination with each other.

DETAILED DESCRIPTION

Figure 1:
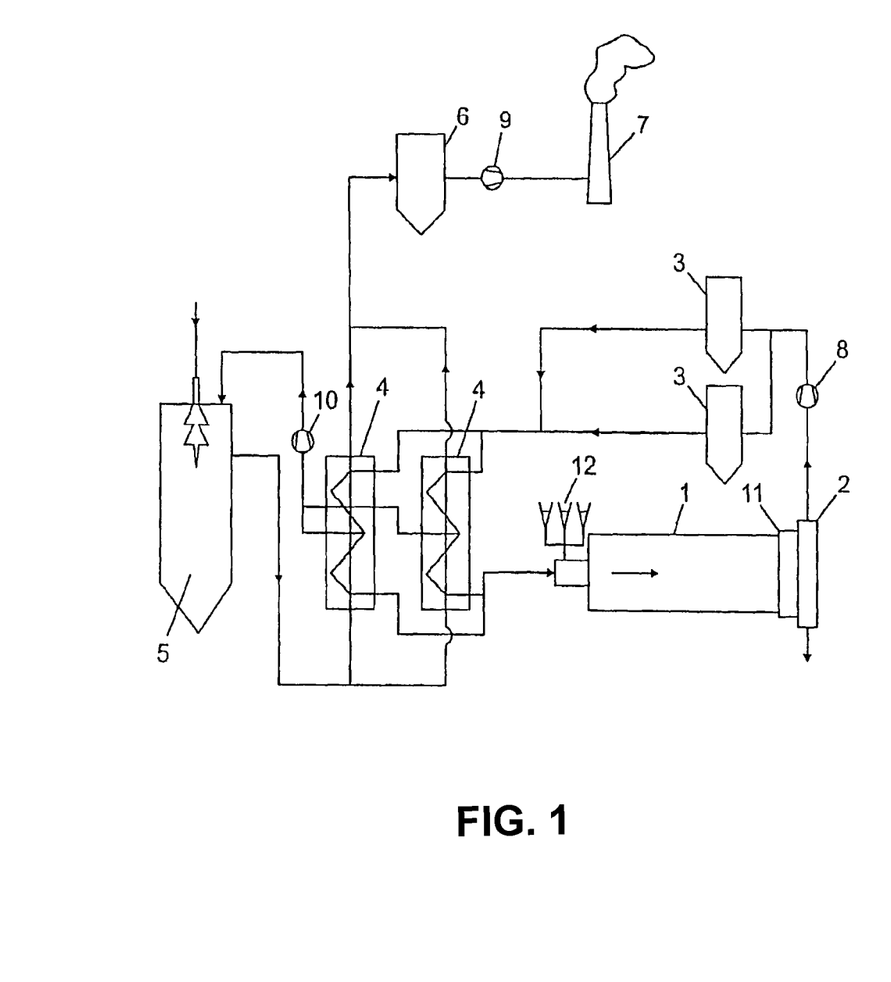
FIG. 1 shows a schematic illustration of a process picture for an apparatus, which is suitable for a preferred embodiment of the inventive method.

The process picture shown in FIG. 1 of an apparatus to put the inventive method into practice comprises a drum dryer 1, a removal housing 2, a cleaning apparatus 3, heat-exchanger 4, a combustion chamber 5, filter 6 as well as a chimney 7. A drying vapor fan 8 is arranged between the drum dryer 1 and the cleaning apparatus 3, a burner exhaust fan 9 is arranged between filter 6 and chimney 7 and between heat-exchanger 4 and combustion chamber 5 a regulable partial vapor fan 10 is arranged.

Dryer 1 may be provided with a slow-down zone 11 and a metering device 12.

The drum dryer 1 is supplied with bulk goods, as for example with wooden chips and/or wooden fibers. The drying gases, which are supplied to the drum dryer 1 are heated-up via the heat exchanger 4 and have temperatures in the range of approximately 250° C. up to approximately 600° C. The heating of the drying gases in the heat-exchangers 4 is achieved in cross counter flow by means of exhaust gases from the combustion chamber 5. The exhaust gases have temperatures in the range of approximately 750° C. up to approximately 900° C. Inside of the combustion chamber 5 temperatures of approximately 750° C. up to 1050° C. are achieved, wherein as fuel for example natural gas, oil and/or wood dust or other waste materials from the production of wooden material boards may be used. The different fuels may be used alone or in any combination with each other.

After the drying goods have passed the drum dryer one slow-down zone 11 may be provided for the drying goods and/or a removal housing 2 to remove the dried bulk goods. The drying gases respectively the drying vapors are driven via the drying vapor fan 8 to one or more cleaning apparatuses 3, preferably cyclone separators. Alternatively or additionally a drying vapor fan may be arranged between the cleaning device 3 and the heat exchanger 4. In the cleaning device 3, fine dust and other particles are separated. The separated material may than advantageously be passed to the production. After the drying vapors have passed the cleaning device 3, they are guided to one or more heat-exchangers 4. Two parallel operating heat-exchangers are preferred. Inside of the heat-exchanger 4 the drying vapors are heated from approximately 110° C. to 130° C. up to 250° C. to approximately 600° C. This is done in a cross counter flow operation by means of the exhaust gases of the burner from the combustion chamber 5. Inside of the heat-exchanger 4 a part of the vapor is separated and led to the combustion chamber 5 as combustion air and/or cooling air. This part of the vapor is driven by the regulable partial vapor fan 10. The exhaust gas of the burner, which serves to heat-up the drying gases in heat-exchanger 4, is guided—after passing through the heat-exchanger 4—to a filter 6. This is in particular an electrostatic precipitator, preferably a dry type electrostatic precipitator. The filter 6 is preferably operated in a suction operation, whereby after the filter 6 a fan 9 for the exhaust gas of the burner is provided. The thus cleaned exhaust gas of the burner is released via chimney 7 into the environment.

According to the invention, the drying of the wood chips is done in a dedicated vapor circuit. Thereby a high vapor content can advantageously be achieved and thus a gentle drying can be realized, which has a positive effect to the quality of the drying goods. Further, thereby the pollution and thus the wear of the drying circuit can be kept to a minimum. Also the fire protection can be improved due to the indirect heating of the dryer and the dedicated drying circuit.

The regulation (i.e. control) of the regulable partial vapor fan 10 is done in a preferred embodiment via the pollution level of the exhaust gases of the burner, as for example by means of the concentration of nitrogen oxides and/or the concentration values of carbon monoxide. Further, the regulable partial vapor fan may be controlled via a maximum inert gas content in the drying circuit or via the oxygen contend in the exhaust gas of the burner.

In a preferred embodiment, the supply of the drum dryer 1 with bulk goods is done while controlling the water content in the dryer by means of the metering device 12, whereby the bulk goods are metered depending on the moisture of different bulk good fractions upon supply to the drum dryer 1.

Preferably different exhaust gases from the manufacturing of the wooden material boards are used as combustion air for the burner, as for example exhaust gases from the press arrangements, exhaust gases from the sawing arrangements and/or exhaust gases from the boiler. The different exhaust gases are preferably pre-heated before they are supplied as combustion air, in particular by means of heat-exchangers.

Figure 2:
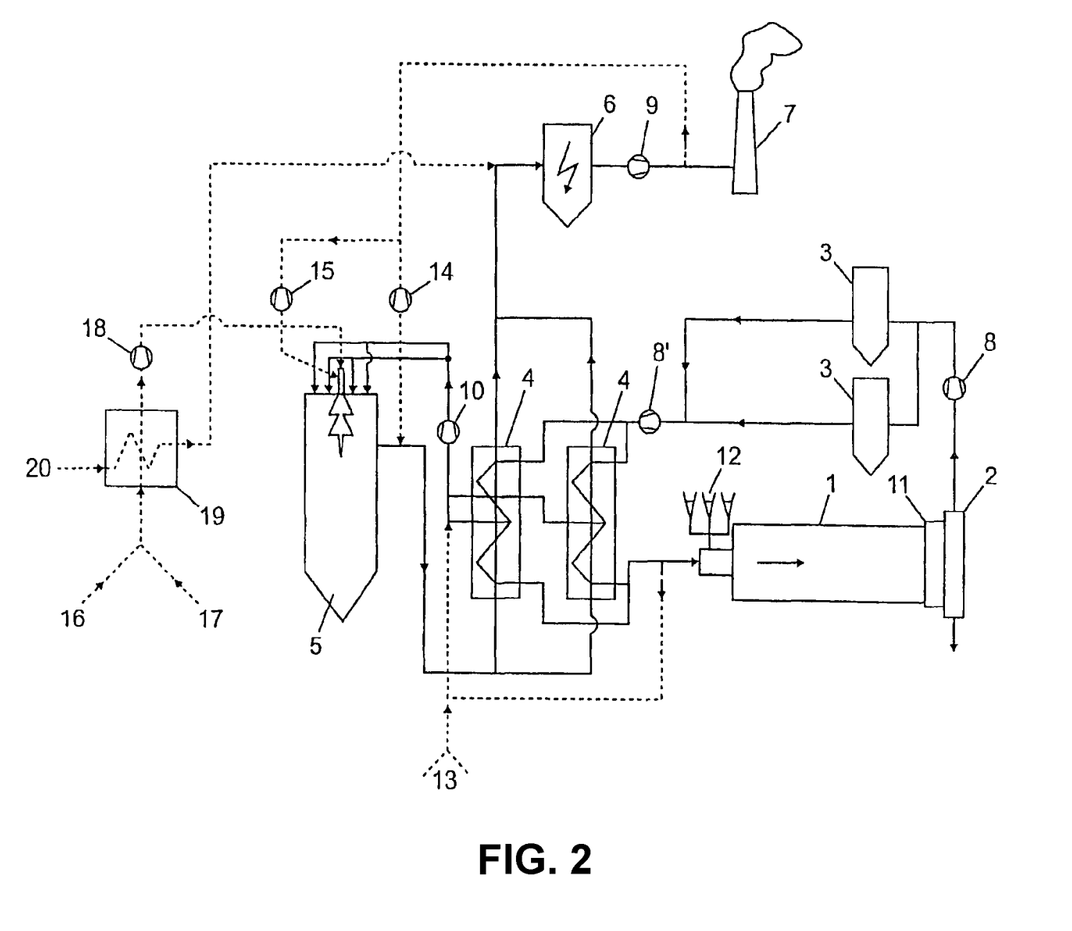
FIG. 2 shows a schematic illustration of a process picture for an apparatus to realize a preferred embodiment of the inventive method with extension in the air circuitry.

FIG. 2 shows a process picture of an inventive apparatus for the continuously drying of bulk goods, wherein different possibilities of air flow are shown. The different elements of the apparatus have the same reference number as in FIG. 1. The drying vapor fan 8 is arranged between the cleaning apparatus 3 and the heat-exchangers 4. This arrangement can be provided alternatively or in addition to the arrangement of the drying vapor fan 8 between a dryer 1 and cleaning apparatus 3. The cooling air is led to the burner 5 via two rings arranged in the ceiling of the combustion chamber. This cooling air is branched off from the drying vapors inside of heating exchanger 4 and driven via the regulable partial vapor fan 10. This air flow may be supplemented or replaced by an additional air supply 13. Further, this air flow may be supplemented by separating a part of the heated drying gases after the heat-exchanger 4. These switchable air flows are shown by dashed lines in FIG. 2. The exhaust gases of the burner which leave the burner 5 can be provided before they are passed to the heat-exchangers 4 with additional exhaust gases of the burner, which already passed through the heat-exchanger 4, and in particular with exhaust gases of the burner, which already have passed through the filter 6. These exhaust gases of the burner may alternatively or in addition be provided as cooling air for the muffle and/or combustion air for the combustion chamber 5. Fans 14 and 15 are preferably provided to drive these exhaust gases of the burner.

The combustion air for burner 5 can preferably be taken from different sources. For example, one can use exhaust gases from the press air 16 and/or exhaust gas from the sawing arrangements 17. This exhaust gas is driven via a further fan 18 and provided to the combustion chamber 5 as combustion air. Preferably, this combustion air is pre-heated before it is passed to the combustion chamber 5, in particular via a heat-exchanger 19, which is heated from boiler exhaust gas 20. Preferably, this boiler exhaust gas is passed after being led through heat-exchanger 19 to filter 6 and released via chimney 7 to the environment.

Figure 3:
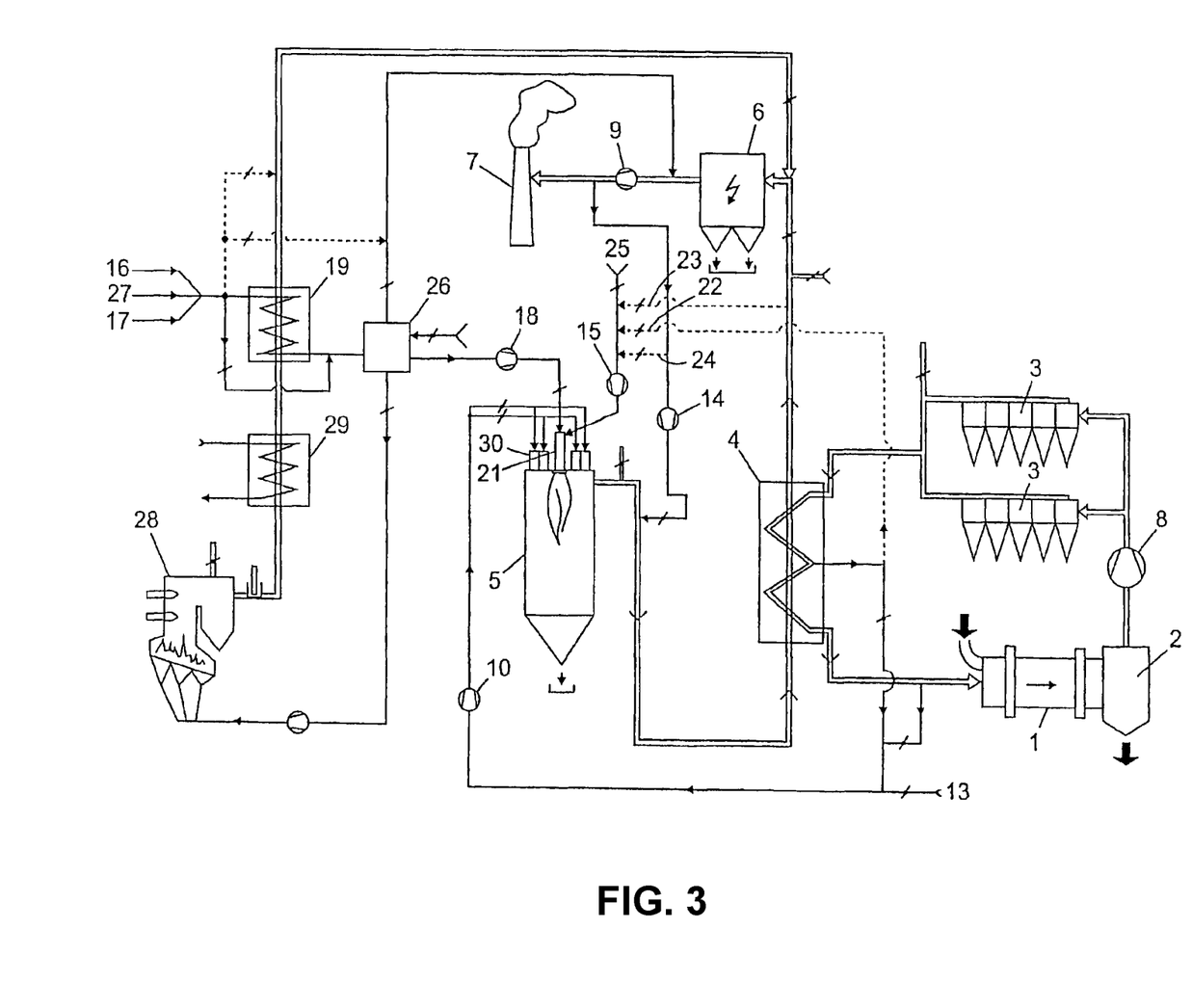
FIG. 3 shows a schematic illustration of a process picture for an apparatus to put one preferred embodiment of the inventive method with an integrated boiler arrangement into practice.

FIG. 3 shows a further embodiment of an apparatus for the inventive method with an integrated boiler arrangement and with different air flows. The different elements of this apparatus are provided with the same reference numbers as in FIG. 1. The apparatus comprises a dryer 1, a removal housing 2, a cleaning apparatus 3 in form of two cyclone separators and a heat-exchanger 4 in the actual drying circuit. The heat-exchanger 4 is supplied with exhaust gases of the burner from burner 5. Inside of the heat-exchanger 4 a partial flow of the drying vapors is branched off. This partial flow is driven via the regulable partial vapor fan 10 and led to the burner 5 as cooling air. The cooling air supply is done via inner and outer nozzle rings 13 being arranged in the ceiling of the combustion chamber of burner 5.

Muffle 21 of burner 5 is cooled by supply of cooling air. This cooling air is driven via fan 15. The supply of this cooling air respectively the cooling of muffle 21 can be achieved by different lines. For example, the cooling of the muffle may be done with fresh air 25. Alternatively or in addition to this a supply of a part of vapors 22, a supply with exhaust gas of the burner after heat-exchanger 23, or a supply with an exhaust gas after the electrical precipitator 24, can be arranged. The supply of these different air flows can be done by correspondingly provided valves. The combustion air for burner 5 is driven by fan 18. As combustion air one may use exhaust air from press 16 respectively from the saw 17 and/or other kind of exhaust gases 27 can be used. These exhaust gases are heated via a heat-exchanger 19 in particular with an air-to-air heat-exchanger.

The supply as combustion air is controlled via a heating pot 26. The heat-exchanger 19 is fed with exhaust gases from the boiler, which result from the boiler arrangement 28. In order to control the temperature of the exhaust gases from the boiler being directed to heat-exchanger 19, an additional heat-exchanger 29 may be provided, in particular a thermo oil heat-exchanger. The pre-heated combustion air may be guided by a corresponding switching arrangement inside of the heating pot 26 to the burner 5, to the boiler arrangement 28 and/or the chimney 7.

The invention claimed is:

1. Method for continuously drying bulk goods in a dryer, which is supplied with bulk goods and through which a vapor gas mixture passes in a drying circuit, the method comprising:
   indirectly heating the vapor gas mixture via at least one heat exchanger by a burner exhaust gas, wherein the drying vapors are guided and heated up in the at least one heat exchanger;
   branching off upstream, downstream and/or within the at least one heat exchanger at least a partial flow of the drying vapors to be conducted into the burner wherein the partial flow to the burner is driven by at least one regulable partial vapor fan, which is regulated via the pollution level of the burner exhaust gases and which regulable partial vapor fan increases the flow volume and flow rate of the partial flow of the drying vapors to the burner, if the moisture content in the drying vapors rises; and
   supplying cooling air in the burner via an inner nozzle ring and an outer nozzle ring provided in the ceiling of the combustion chamber;
   wherein the inner nozzle ring and the outer nozzle ring are controlled separately from each other.

2. A method according to claim 1, wherein the pollution level of the burner exhaust gases are nitrogen oxides and/or carbon monoxides.

3. A method according to claim 1, wherein the burner exhaust gas is cleaned by at least one filter.

4. A method according to claim 3, wherein the filter is operated in suction mode.

5. A method according to claim 3, wherein the filter is an electrostatic precipitator.

6. A method according to claim 1, wherein, at least partially, solids are used as fuel for the burner.

7. A method according to claim 1, wherein the drying vapors are cleaned after passing through the dryer.

8. A method according to claim 7, wherein as cleaning apparatus at least one cyclone is used.

9. A method according to claim 1, wherein the drying vapors after the dryer are driven by at least one drying vapor fan.

10. A method according to claim 1, wherein the water content in the dryer is regulated, whereby the bulk goods are metered depending on the moisture of different bulk good fractions when supplying the dryer.

11. A method according to claim 1, wherein the burner is supplied with at least one further exhaust gas as combustion air and/or cooling air.

12. A method according to claim 11, wherein the additional exhaust gas is preheated before it is supplied as combustion air.

13. A method according to claim 1, wherein the inner and the outer nozzle ring have an entering angle between approximately 0 and approximately 60 degrees.

14. A method according to claim 13, wherein the angle is adjustable depending on the fuel used.

15. The method of claim 1, wherein:
   the supplied cooling air in the burner is branched off from the drying vapors and driven via the regulable partial vapor fan; and
   an air flow of the supplied cooling air is supplemented by an additional air supply.

16. A method for the manufacturing of wooden material boards, wherein wood logs are stripped of bark and are processed in a crushing apparatus to wood chips and/or fibers, wherein the wood chips and/or fibers are dried in a drying apparatus, wherein the dried wood chips and/or fibers are processed to boards in a pressing arrangement, if necessary by adding binders and/or further additives, and are preferably cut into size, wherein for drying of the wood chips and/or fibers a method according to claim 1 is carried out.

17. Arrangement for drying of bulk goods, comprising:
   a dryer,
   at least one burner comprising a combustion chamber ceiling with an inner nozzle ring and an outer nozzle ring that are separately controllable,
   at least one heat exchanger provided to indirectly heat a vapor gas mixture for drying the bulk goods in the dryer,
   at least one branch line, upstream, downstream and/or within the at least one heat exchanger to the burner to branch off a partial flow of the drying vapors, and
   at least one line for the remaining partial flow to the dryer,
   wherein the branch line to the burner at least one regulable partial vapor fan is provided,
   wherein the partial flow to the burner is driven by the at least one regulable partial vapor fan, which is regulated via the pollution level of the burner exhaust gases and which regulable partial vapor fan is configured to increase the flow volume and flow rate of the partial flow of the drying vapors to the burner, if the moisture content in the drying vapors rises.

18. An apparatus according to claim 17, wherein the pollution level is nitrogen oxide and/or carbon monoxide.

19. An apparatus according to claim 17, wherein for the cleaning of burner exhaust gases at least one filter is provided.

20. An apparatus according to claim 19, wherein a burner exhaust gas fan is positioned downstream of the filter.

21. An apparatus according to claim 19, wherein the filter is an electrostatic precipitator.

22. An apparatus according to claim 17, wherein for cleaning of the drying vapors a cleaning arrangement is provided.

23. An apparatus according to claim 22, wherein the cleaning arrangement is at least one cyclone.

24. An apparatus according to claim 17, wherein downstream of the dryer at least one drying vapor fan is provided.

25. An apparatus according to claim 17, wherein to regulate the water content in the dryer, a metering device is provided.

26. An apparatus according to claim 17, wherein at least one supply line for additional exhaust gases as combustion air into the burner is provided.

27. An apparatus according to claim 26, wherein heat exchanger, are provided for a preheating of the additional exhaust gases before the same are supplied to the burner.

28. An apparatus according to claim 17, wherein the inner and outer nozzle ring comprises an entering angle of approximately 0 degrees to approximately 60 degrees.

29. The arrangement of claim 17, wherein:
cooling air is supplied in the burner via the inner nozzle ring and the outer nozzle ring;
the supplied cooling air in the burner is branched off from the drying vapors and driven via the regulable partial vapor fan; and
an air flow of the supplied cooling air is supplemented by an additional air supply.

30. An arrangement for the manufacturing of wooden material boards with at least one crushing device, at least one drying device and at least one pressing device, wherein a drying arrangement according to the apparatus of claim 17 is provided.

* * * * *